United States Patent Office 3,067,228
Patented Dec. 4, 1962

3,067,228
SEPARATION OF ALUMINUM CHLORIDE COMPLEXES USING CARBON DISULPHIDE
Bernard L. Evering, Chicago, Ill., and Alan K. Roebuck, Schererville, Ind., assignors to Standard Oil Company, Chicago, Ill., a corporation of Indiana
No Drawing. Filed Sept. 30, 1960, Ser. No. 59,480
6 Claims. (Cl. 260—448)

This invention relates to recovery of aluminum chloride-ether complex from solution admixture with aluminum chloride-hydrocarbon complexes.

There has been known in the hydrocarbon conversion art the ability of complexes of aluminum chloride and ethers to function as a catalyst. Many ethers react with aluminum chloride to form catalytically active complexes. Particularly good catalysts of this type are combinations of dialkyl ethers and aluminum chloride. It is now known that these particular complexes require the presence of more than one mole of aluminum chloride per mole of ether and less than two moles of aluminum chloride per mole of ether to be an active catalyst. An equimolar combination of aluminum chloride and dialkyl ether is not in itself catalytically active.

It is now believed that the "complex" containing more than one mole of aluminum chloride per mole of ether is actually a solution of aluminum chloride in the equimolar complex. This dissolved aluminum chloride—now designated "free-$AlCl_3$"—is the active catalytic material. However, the ether complex and free-$AlCl_3$ solution forms the catalyst system utilized in hydrocarbon conversion processes such as paraffin alkylation, aromatic alkylation, paraffin isomerization, olefin polymerization, etc.

Aluminum chloride reacts with many hydrocarbons to produce complexes commonly called aluminum chloride-hydrocarbon complex. These complexes are formed very readily from olefinic hydrocarbons and aromatic hydrocarbons. Complexes are formed less readily with saturated hydrocarbons such as paraffins and cycloparaffins. In general, aluminum chloride-hydrocarbon complexes contain in a range of 25–75 weight percent of aluminum chloride and the remainder hydrocarbon. The hydrocarbon recovered from the complex by hydrolysis is a polyolefinic oil commonly called "red oil" from its typical color. For many purposes these aluminum chloride-hydrocarbon complexes are effective catalysts. However, their presence is undesirable when the desired catalyst is an aluminum chloride-ether complex. When aluminum chloride-ether catalyst system is utilized for hydrocarbon conversion, particularly paraffin alkylation and olefin polymerization, the free-aluminum chloride content reacts to form aluminum chloride-hydrocarbon complex. The rate of formation of this aluminum chloride-hydrocarbon complex is dependent upon the type of hydrocarbon charged, operating conditions, and presence of materials which inhibit the rate of formation of the undesired aluminum chloride-hydrocarbon complex.

The aluminum chloride-ether complexes and the aluminum chloride-hydrocarbon complexes are essentially completely miscible and form solution mixtures. Thus, shortly after an aluminum chloride-ether catalyst system catalyzed hydrocarbon conversion process goes on-stream the catalyst zone contains aluminum chloride-ether complex, free-aluminum chloride, and aluminum chloride-hydrocarbon complex. The activity of the catalyst phase declines with the build up of aluminum chloride-hydrocarbon complex since the catalytic power affording free-aluminum chloride is decreased by this side reaction with hydrocarbon. It is possible to completely destroy the catalytic activity unless a procedure is set up to counteract the loss of free-aluminum chloride.

In continuous operation it is customary to more or less continuously add free-aluminum chloride to the catalyst phase—usually by dissolving aluminum chloride into the feed hydrocarbon prior to entry of the feed into the reaction zone. However, even under these conditions the build up of the aluminum chloride-hydrocarbon complex reached the point wherein the product no longer is of the characteristics obtainable from an aluminum chloride-ether catalyst system operation wherein the aluminum chloride-ether catalyst system is low in aluminum chloride-hydrocarbon complex.

In a paraffin alkylation process utilizing aluminum chloride dialkyl ether complex as described in U.S. Patent No. 2,897,248, it is permissible to have the catalyst phase be a solution mixture of aluminum chloride-ether complex and aluminum chloride-hydrocarbon complex containing from about 5 to 25 weight percent of aluminum chloride-hydrocarbon complex. Generally, it is desired to keep the content of aluminum chloride-hydrocarbon complex below about 10 percent. In some hydrocarbon conversion processes, catalyst phase containing as much as 40 or even 50 weight percent of the aluminum chloride-hydrocarbon complex may be permitted.

Aluminum chloride catalyzed processes are costly because of the cost of aluminum chloride and aluminum chloride-ether complex catalyst is even more costly owing to the need to use two fairly expensive ingredients. For economic reasons, it is very desirable to reduce the loss of aluminum chloride-ether complex to the smallest possible amount. When the catalyst phase has reached a concentration of aluminum chloride-hydrocarbon complex such that the desired product can no longer be obtained, it is necessary to withdraw a portion of the catalyst phase and add either free-aluminum chloride-ether complex or a recycle complex of desirably high aluminum chloride-ether complex content.

Although the aluminum chloride-ether complex and aluminum chloride-hydrocarbon complex are essentially completely miscible, they are not equally soluble in hydrocarbons. Advantage has been taken in this difference in solubility to separate aluminum chloride-hydrocarbon complex from aluminum chloride-ether complex. However, the capacity of hydrocarbons such as isobutane or butane, pentane, or hexane for aluminum chloride-ether complex is low and the selectivity between the two different complexes leaves much to be desired.

It has been discovered that carbon disulfide has a high capacity for aluminum chloride-ether complex. And that carbon disulfide has extremely low capacity for aluminum chloride-hydrocarbon complexes. Thus a solution mixture of aluminum chloride-ether complex and aluminum chloride-hydrocarbon complex when contacted with carbon disulfide, both in the liquid phase, produce a raffinate phase and an extract phase. The extract phase comprises carbon disulfide and aluminum chloride-ether complex; essentially the ether complex is the only complex present in the extract phase. The raffinate phase comprises a solution mixture of the ether complex and the hydrocarbon complex but contains a greater content of the hydrocarbon complex than did the original solution mixture of the complexes.

The process of the invention is particularly adapted for solution mixtures where the complex consists of aluminum chloride and dialkyl ether. It is preferred that the ether be a di-n-alkyl ether wherein each of the n-alkyl groups contains 1, 2, 3 or 4 carbon atoms. The particular n-alkyl groups are methyl, ethyl, n-propyl and n-butyl. Illustrative ethers are dimethyl ether, diethyl ether, methylethyl ether, di-n-propyl ether, methyl-n-propyl ether, and di-n-butyl ether. In low temperature operation, methylethyl ether or a physical mixture of dimethyl ether and diethyl ether have been found to be particularly useful. Another particularly suitable combination of ethers for use in low temperature is the equilibrium mixture of diethyl ether, dimethyl ether and methylethyl ether from dehydration of an equimolar mixture of ethanol and methanol.

Processes involving paraffin alkylation with an olefin containing from 2 to 5 carbon atoms produce aluminum chloride-hydrocarbon complexes which are particularly low in solubility in carbon disulfide. Illustrations of these olefins are ethylene, propylene, isobutylene, butene-2, and pentene-2. Isoparaffins used in these alkylation processes suitably contain 4–8 carbon atoms; particularly these isoparaffins are isobutane and isopentane.

The liquid phase contacting of the process may be carried out at temperatures wherein the complexes are sufficiently fluid to permit adequate contacting with the carbon disulfide. Temperatures should be maintained below those at which significant amounts of ether complex decomposition occur. In general, the contacting temperature is from about 0° F. to about 200° F. and more commonly 60° F.–120° F.

The amount of carbon disulfide utilized is dependent in part on the completeness with which the solution mixture of complexes is to be denuded of the aluminum chloride-ether complex. And also on the operating conditions such as the degree of intermingling effectiveness and operating temperature. It is to be understood that the amount of carbon disulfide will not be so great as to take into solution aluminum chloride-hydrocarbon complex beyond that acquired by ordinary solution in a substantially saturated carbon disulfide-ether complex solution. Usually about 15 to about 200 parts by weight of carbon disulfide will be present in the contacting zone for each part of aluminum chloride-ether complex present in said solution mixture charged to the contacting zone. More commonly, 25–100 parts of carbon disulfide will be used per part of the ether complex charged.

Other procedures may be utilized to separate the carbon disulfide and the complexes dissolved therein but the simplest operation is to distill away the carbon disulfide, leaving the complexes behind. By the control of carbon disulfide content, it is possible to recover from the extract phase a mixture of complexes wherein the aluminum chloride-ether complex is substantially the only complex present—which may be easily 90 percent of the total complex recovered and readily as much as 95 percent of the complex recovered. Dependent upon the particular ether complex and the particular hydrocarbon complex, the "purity" of the ether complex recovered from the carbon disulfide may closely approach 100 percent.

The contacting zone may be batch or continuous utilizing the various types of contacting equipment utilized in the solvent extraction art, exemplified by lubricating oil preparation in the petroleum industry. Exact details of contacting equipment may be readily devised by those of ordinary skill in this art.

*Illustration*

The solubility of a complex formed from a CP grade aluminum chloride and diethyl ether and containing equimolar amounts of each material, in carbon disulfide was determined at a temperature of 115° F.—about the boiling point of carbon disulfide. This ether complex was soluble to the extent of 4.3 weight percent in carbon disulfide—based on 100 parts of the carbon disulfide.

A complex was formed from aluminum chloride and iso-octane containing about 65 weight percent of aluminum chloride. This complex is very similar to that obtained as a side reaction product in butene-butane alkylation using aluminum chloride-ether complex catalyst system. At 115° F. this complex was soluble in carbon disulfide to the extent of not more than 0.1 weight percent.

At this temperature, the above aluminum chloride-ether complex is soluble in isobutane to the extent of 1.0 weight percent. (Thus, the carbon disulfide has a capacity more than four times that of of isobutane.)

Thus, having described the invention, what is claimed is:

1. A process which comprises liquid phase contacting of carbon disulfide and a solution mixture of aluminum-chloride-ether complex and aluminum chloride-hydrocarbon complex, containing a substantial amount of said aluminum chloride-hydrocarbon complex, under conditions to produce a raffinate phase comprising a solution mixture of said complexes of greater aluminum chloride-hydrocarbon complex content and an extract phase comprising carbon disulfide and aluminum chloride-ether complex as substantially the only complex present and recovering the complexes contained in said extract phase.

2. The process of claim 1 wherein said mixture contains about 5–25 weight percent of aluminum chloride-hydrocarbon complex.

3. The process of claim 1 wherein said aluminum chloride-ether complex consists of about equimolar amounts of aluminum chloride and di-n-alkyl ether wherein each alkyl group contains 1–4 carbon atoms.

2. The process of claim 1 wherein said mixture contains about 5–25 weight percent of aluminum chloride-hydrocarbon complex.

3. The process of claim 1 wherein said aluminum chloride-ether complex consists of about equimolar amounts of aluminum chloride and di-n-alkyl ether wherein each alkyl grup contains 1–4 carbon atoms.

4. The process of claim 1 wherein said contacting is at a temperature from about 0° F. to 200° F.

5. The process of claim 1 wherein from about 15 to about 200 parts by weight of carbon disulfide is present for each part of aluminum chloride-ether complex in said mixture charged to the contacting zone.

6. The process of claim 5 wherein said presence is about 25–100.

References Cited in the file of this patent
UNITED STATES PATENTS 2,477,290   Dornte et al. _____ July 26, 1949

OTHER REFERENCES

Brown: Unit Operations, page 297 (1950).